United States Patent [19]

Riley

[11] 4,037,788
[45] July 26, 1977

[54] FENCE CONSTRUCTION

[76] Inventor: Harry D. Riley, 1302 W. Camelback, Phoenix, Ariz. 85013

[21] Appl. No.: 637,155

[22] Filed: Dec. 3, 1975

[51] Int. Cl.² .................. A01G 25/00; E04H 17/14
[52] U.S. Cl. .................................. 239/207; 256/65; 256/21; 403/177; 403/391; 403/292; 239/268
[58] Field of Search ............... 256/1, 21, 24, 25, 59, 256/65; 225/370; 403/292, 177, 391

[56] References Cited

U.S. PATENT DOCUMENTS

| | | | |
|---|---|---|---|
| 385,531 | 7/1888 | Shrader | 256/24 UX |
| 2,940,466 | 6/1960 | Speights | 137/356 |
| 3,285,576 | 11/1966 | Clark | 256/65 X |
| 3,353,774 | 11/1967 | Thomas | 403/392 X |
| 3,477,750 | 11/1969 | Powell | 285/382 X |
| 3,486,739 | 12/1969 | Nelson et al. | 256/65 |
| 3,689,112 | 9/1972 | Slator et al. | 285/370 X |

Primary Examiner—Wayne L. Shedd
Attorney, Agent, or Firm—Clarence A. O'Brien; Harvey B. Jacobson

[57] ABSTRACT

A fence construction for maintaining stock in a confined area made from rust resistant metal tubing and constructed without the use of nuts, bolts, or welding. The horizontal rails are hollow tubing connected at their ends with connectors to form continuous rails and the supporting posts are also formed from tubing with rail supporting hollows or indents formed therein to securely support said horizontal rails. Metal bands placed around the posts just below the rails lock the rails into position and the foot of each post is set in concrete. An additional feature is that one or more of the horizontal hollow horizontal rails may be provided with sprinkler heads and the rails hooked to a source of water under pressure for irrigation of the area the fence encloses.

7 Claims, 4 Drawing Figures

U.S. Patent July 26, 1977 4,037,788
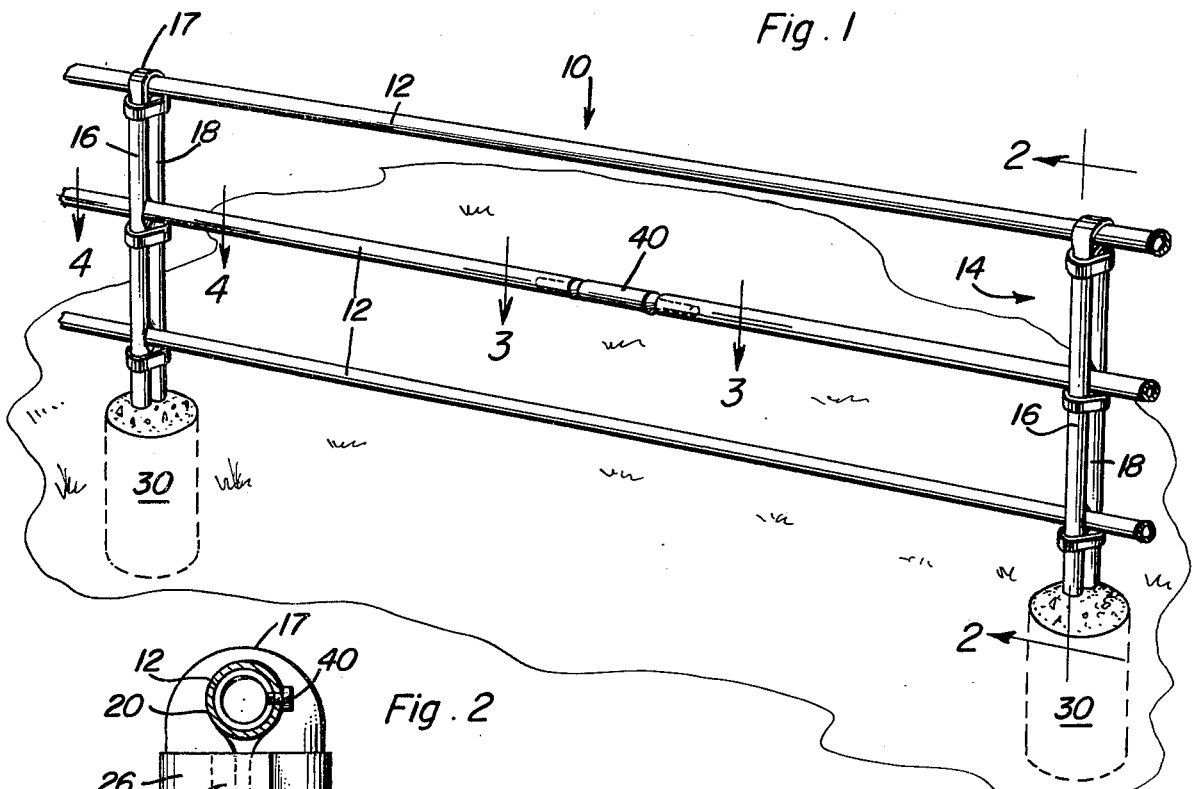
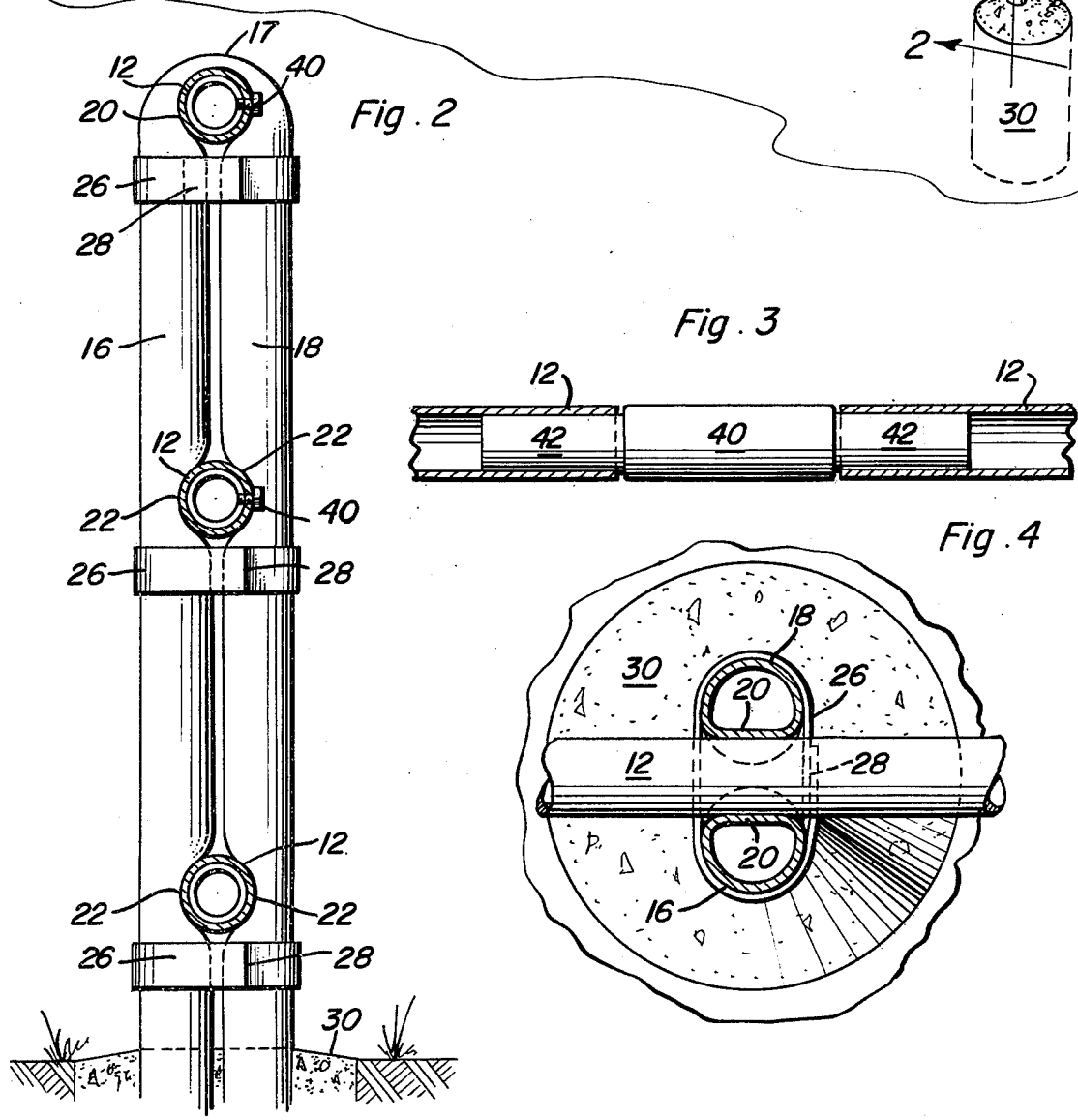

FENCE CONSTRUCTION

BACKGROUND OF THE INVENTION

This invention relates generally to fence construction and the type of construction used for the rails and posts of a stock enclosing type fence.

DESCRIPTION OF THE PRIOR ART

One of the big problems of known prior art devices for constructing fences to enclose cattle, etc., is that such construction normally involves many pieces and components in order to complete the over-all fence. In addition, it is often necessary to paint said fences, in the case of ones of wood construction, or said fences can be chewed or easily broken and damaged by the livestock, weather and other deteriative forces. Also a problem with wood-type constructed fences is that many times parts of the fence will splinter and cause injury to the stock being contained therein. A further known problem of prior art fence construction is that many component parts are required and must be fabricated and supplied in advance of the fence construction. Known prior art devices which may be pertinent to this invention are listed as follows:

U.S. Pat. Nos. 318,655— May 26, 1885
U.S. Pat. Nos. 398,698— Feb. 26, 1889
U.S. Pat. Nos. 3,285,576— Nov. 15, 1966
U.S. Pat. Nos. 3,425,630— Feb. 4, 1969.

SUMMARY OF THE INVENTION

An object of the present invention is to provide fence construction of unique mechanical design principally for the purpose of confining stock to a limited area.

Another object of this invention is to provide a fence constucted of non-rusting metal which will be maintenance free and yet easy to erect and complete without the use of many components and/or complicated construction tools.

A further object of this invention is to provide a construction for fence posts and horizontal rails which eliminate the use of nuts, bolts, or welding and allow for easy erection in the field and on site.

A further object of this invention is to provide a fence construction which will also permit irrigation of the area being confined through the use of one or more of the horizontal rail tubings having sprinkler heads attached thereto at appropriately spaced points therealong.

A still further object of this invention is to provide a construction of fence posts and rails which will allow running over uneven terrain, up and down hills, etc., and where the fence posts will always be perpendicular to the horizon but the construction of said fence is such that the rails will conform to the ground contours.

One of the big features of the invention disclosed herein is in the fact that the fence can be easily and quickly erected without requiring welding, or complicated construction equipment. The manner of construction of this invention also permits easy adaptability of the over-all fence to the contours of the ground surface. That is, the fence may be constructed on uneven terrain, up and down hills and valleys, etc., with the rails following the contour of the land while the fence posts are always in a completely upright position.

Another feature of this invention is that the over-all fence is constructed of rust-resistant or non-rusting type metal tubing which reduces the problem of rusting normally associated with metal fences. No painting or other maintenance problems are normally encountered.

Another feature is that using the horizontal or substantially horizontal hollow tubing rails in the manner disclosed permits one or more of said rails to be used for irrigation purposes by attaching sprinkler heads at appropriately spaced points along said rails and connecting said rails to a proper water pressure system. This permits the confined area for stock or other animals to be regularly irrigated so that grass, etc., growing within said area will have adequate water for proper growth.

These together with other objects and advantages which will become subsequently apparent reside in the details of construction and operation as more fully hereinafter described and claimed, reference being had to be accompanying drawings forming a part hereof, wherein like numerals refer to like parts throughout.

BRIEF DESCRIPTION OF THE DRAWINGS

FIG. 1 is a perspective view of the fence constructed in accordance with this invention.

FIG. 2 is a view, partly in cross-section, taken generally along line 2—2 of FIG. 1.

FIG. 3 is a view, partly in cross-section, taken generally along line 3—3 of FIG. 1.

FIG. 4 is a view, partly in cross-section, taken generally along line 4—4 of FIG. 1.

DESCRIPTION OF THE PREFERRED EMBODIMENT

Referring to FIG. 1 of the drawings, reference numeral 10 designates the over-all fence as constructed according to this invention. A vertical fence post is shown generally designated by numeral 14 to the right of the figure, said post comprising a piece of hollow tubing, generally $1\frac{5}{8}$ inches to $2\frac{3}{8}$ inches in diameter and of rust-resistant metal. Galvanized tubing is generally to be preferred, but other metals may be used. The horizontal rails supported by the posts are indicated by reference numeral 12 and are supported by the posts as best seen in FIG. 2.

The hollow tubing for the fence posts are cut to the proper lengths for the desired height of the fence to be built, said posts being pre-cut before delivery to the field site. Assuming, for exmaple, that a fence approximately four feet high is to be built, tubing approximately 14 to 15 feet would be required and at the midpoint of each piece of tubing or at approximately 7 to $7\frac{1}{2}$ feet, the tubing is deformed on one side thereof and then bent into a circular-type opening as best seen in FIG. 2 to snugly fit around the top horizontal fence rail member 12. At this point, the tubing will have two leg portions 16 and 18 and then a galvanized metal band 26 will be secured around the two leg portions just below the rail member. The band is secured at the portion 28 by any conventional clamp means, metal-solder, or even welding if one prefers. Metal strap connectors and clamps are conventional and well known and normally would be used. Obviously, galvanized wire could be used instead of metal straps if such were more easily handled than the strap material. Usually the components are pre-formed before delivery to the job site, but this invention also envisions the complete cutting and fabrication of the components in the field.

The inner portion of the legs 16 and 18 are also deformed at appropriate distances from the top portion of the posts for receiving as many additonal horizontal rails as is desired for the over-all fence construction. In the example shown, two more rails are provided with the additional deformed semi-circles 22 appropriately formed into the leg members 16 and 18. After each additional rail is mounted in the corresponding posts, additional bands 26 are applied therebeneath to lock the rails in place. It is also noted that the bands 26 may be pre-formed of approximately the correct diameter and pre-welded at 28, and hammered into place on site which eliminates any fastening of said straps whatsoever in the field.

Once the desired number of rails are locked into place with the fence posts, then said posts are appropriately set into concrete with approximately 3 feet of the posts embedded in said concrete 30. The rails 12 have some length and at the ends thereof connectors 40 are used to connect same to the next rail. Said connectors or inverted swages comprise a main body portion 40 with two ends reduced in size 42, as best seen in FIG. 3. A connector generally would be about 12 inches long with about 4 inches at each end reduced in circumference one-eighth of an inch or so to allow for insertion of the ends into the hollow tubing of the rail members. The connectors may be of solid construction or if, as described below, the hollow rails are to be used for irrigation purposes, then obviously the connectors would have an opening therethrough and be of hollow material.

Many times fences for maintaining stock in a confined area are used where weather conditions are such that additional irrigation of the area is necessary in order for proper growth of grass and other feed material. With the fence as constructed in accordance with this invention, this problem is easily solved. One or more of the horizontal rail members are used as irrigation means by attaching sprinkler heads or nozzles, such as 40 in FIG. 2, at appropriate points along said rail tubing. At the beginning of the rail tubing, a connection would then be made to an appropriate water pressure system and, of course, the termination of the tubing would be blocked so water could not leak out that end thereof. With such construction, any time it is desired to irrigate the enclosed area one merely has to turn on the water pressure system or open a valve thereto and the sprinkler heads will properly distribute water over the area enclosed.

Another important feature of a fence as constructed according to this invention is that the indented semi-circular deformations of the fence posts 22 may be completely perpendicular to the pipe itself or they may be at an angle thereto. Since the indentations normally are pre-made in the shop, the angle of the indentations can be easily provided and formed to fit the site so that the rail members will conform and follow the terrain. Thus, it can be seen that the fence posts will always be vertical and yet the rail members may go up and down with the terrain without any looseness or sloppiness in the fence construction itself. This is a feature not usually found in fence constructions.

As can be seen, the number of components necessary to erect a fence using the construction disclosed herein are few in number. Namely, tubing for the fence posts, tubing for the rail members, connectors and locking bands, together with usual concrete mixes for setting the posts firmly in the ground. The addition of sprinkler heads and a water pressure system would also be necessary for the irrigation aspect of the fence construction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fence constructed of rust-resistant metal tubing for the purpose of maintaining stock in a confined area, comprising; fence post means which can be fabricated for supporting fence rails without nuts, bolts, or welding; fence rail means supported by said fence post means, and means for locking said fence rail means to said fence post means in a secure manner, the fence post means includes metal tubing flattened and deformed at the center thereof and bent around the fence rail means for the uppermost rail with the two legs formed after the bending extending downwardly for mounting in the ground, and the fence post means has at least one semi-circular deformed portion in each of the vertical extending leg members for holding round fence rail means secured therewithin and supported between the two leg members, the round fence rail means including tubing of indeterminative length supported by the semi-circular deformed portions in said vertical fence post legs, internally mounted swage-type connectors for connecting the ends of horizontal rails together to form continuous fence rails of any desired length, and locking bands tightly fitting around the two leg members of the fence posts and just below each rail member for securely holding said rail members within and to said fence posts.

2. The structure as defined in claim 1 wherein the internal connector swage members are hollow on at least one rail and said rail has sprinkler means spaced therealong for irrigation purposes.

3. The structure as defined in claim 1 wherein there are at least two of said fence posts and each of said fence post are set in the ground with a concrete base securing means.

4. The structure as defined in claim 3 wherein there are at least two horizontal rail members held and supported by the fence posts.

5. The device of claim 4 wherein both the said horizontal rail members have sprinkler heads secured thereto.

6. A fence comprising at least one fence post, said fence post comprising a length of galvanized tubing steel bent back upon itself at its center to form a pair of substantially parallel spaced legs, a deformed circular support opening formed within the post where the tubular steel is bent back upon itself, a horizontal rail member of hollow galvanized tubing supported within said bent back opening, a steel band of non-rusting type encircling said spaced parallel legs just below said horizontal fence rail tubing to lock said rail firmly within the opening, at least one semi-circular deformed area in each of said parallel spaced legs of the fence posts, at least one more horizontal hollow fence rail supported within said deformed areas and locked therein by at least one additional steel band firmly around said two pair of legs and just below the additional horizontal rail member.

7. The structure as defined in claim 6 including sprinkler head means mounted on at least one of said horizontal fence rail tubing members.

* * * * *